(12) United States Patent  
Lozier et al.

(10) Patent No.: US 8,606,373 B2  
(45) Date of Patent: Dec. 10, 2013

(54) FIREFIGHTING MONITOR AND CONTROL SYSTEM THEREFOR

(75) Inventors: Todd B. Lozier, Elkhart, IN (US); James M. Trapp, Galien, MI (US); Lee R. Jones, Wakarusa, IN (US); Eric N. Combs, Goshen, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 228 days.

(21) Appl. No.: 12/764,779

(22) Filed: Apr. 21, 2010

(65) Prior Publication Data

US 2010/0274397 A1    Oct. 28, 2010

Related U.S. Application Data

(60) Provisional application No. 61/171,700, filed on Apr. 22, 2009.

(51) Int. Cl.

| | |
|---|---|
| *G05B 11/01* | (2006.01) |
| *G05B 15/00* | (2006.01) |
| *G08B 25/00* | (2006.01) |
| *A62C 3/00* | (2006.01) |
| *A62C 37/00* | (2006.01) |
| *A62C 37/10* | (2006.01) |

(52) U.S. Cl.  
USPC ............... 700/15; 700/13; 700/17; 700/83; 340/293; 340/586; 169/54; 169/56; 169/60; 34/544

(58) Field of Classification Search  
USPC ............ 340/293, 586; 169/7, 23, 54, 56, 60; 700/13, 15, 17, 83; 34/544  
See application file for complete search history.

(56) References Cited

U.S. PATENT DOCUMENTS

| 2,360,397 A | 10/1944 | Carpenter |
| 2,729,295 A | 1/1956 | Edwards |
| 3,575,351 A | 4/1971 | Warren |
| 3,675,721 A | 7/1972 | Davidson et al. |
| 3,762,478 A * | 10/1973 | Cummins ...................... 169/24 |
| 3,770,062 A | 11/1973 | Riggs |
| 3,786,869 A | 1/1974 | McLoughlin |
| 3,943,312 A | 3/1976 | Bernstein et al. |
| 3,974,879 A | 8/1976 | Nelson, Jr. et al. |

(Continued)

FOREIGN PATENT DOCUMENTS

| JP | 04138176 A | 5/1992 |
| JP | 5092050 | 4/1993 |

(Continued)

OTHER PUBLICATIONS

International Preliminary Report on Patentability mailed Nov. 3, 2011 from the International Bureau in related International Patent Application No. PCT/US2010/032010.

(Continued)

*Primary Examiner* — Ramesh Patel  
(74) *Attorney, Agent, or Firm* — Faegre Baker Daniels LLP

(57) ABSTRACT

A firefighting monitor system includes a monitor, a controller selectively generating signals to the monitor for controlling the monitor, and a computer. The computer is configured to receive input from a user relative to the monitor or the controller. The computer generates an output based on the input, and the output is transmitted to the controller for controlling the monitor or the controller in accordance with the output.

26 Claims, 8 Drawing Sheets

(56) References Cited

U.S. PATENT DOCUMENTS

| | | | |
|---|---|---|---|
| 3,981,618 A | 9/1976 | Nelson, Jr. | |
| 4,007,793 A | 2/1977 | Hux et al. | |
| 4,189,005 A | 2/1980 | McLoughlin | |
| 4,535,846 A | 8/1985 | Gagliardo et al. | |
| 4,593,855 A | 6/1986 | Forsyth | |
| 4,674,686 A | 6/1987 | Trapp | |
| 4,776,403 A | 10/1988 | Lejosne | |
| 4,875,526 A | 10/1989 | Latino et al. | |
| 4,949,794 A | 8/1990 | Petit et al. | |
| 5,044,445 A | 9/1991 | Kayahara | |
| 5,223,822 A | 6/1993 | Stommes et al. | |
| 5,249,632 A | 10/1993 | Sparling et al. | |
| 5,301,756 A | 4/1994 | Relyea et al. | |
| 5,400,246 A * | 3/1995 | Wilson et al. | 700/17 |
| 5,411,100 A | 5/1995 | Laskaris et al. | |
| 5,579,800 A | 12/1996 | Walker | |
| 5,593,092 A | 1/1997 | McMillan et al. | |
| 5,727,933 A | 3/1998 | Laskaris et al. | |
| 5,860,479 A | 1/1999 | LaFollette | |
| 5,899,276 A | 5/1999 | Relyea et al. | |
| 5,979,564 A | 11/1999 | Crabtree | |
| 6,267,539 B1 * | 7/2001 | Mihalcin | 406/38 |
| 6,343,615 B1 | 2/2002 | Miller et al. | |
| 6,421,593 B1 | 7/2002 | Kempen et al. | |
| 6,547,528 B1 | 4/2003 | Yoshida | |
| 6,553,290 B1 | 4/2003 | Pillar | |
| 6,651,900 B1 | 11/2003 | Yoshida | |
| 6,725,940 B1 | 4/2004 | Klein et al. | |
| 6,757,597 B2 | 6/2004 | Yakes et al. | |
| 6,766,863 B2 | 7/2004 | Arvidson et al. | |
| 6,772,845 B1 | 8/2004 | Jansson | |
| 6,786,426 B1 | 9/2004 | Trapp | |
| 6,882,917 B2 | 4/2005 | Pillar et al. | |
| 6,885,920 B2 | 4/2005 | Yakes et al. | |
| 6,886,639 B2 | 5/2005 | Arvidson et al. | |
| 6,909,944 B2 | 6/2005 | Pillar et al. | |
| 6,922,615 B2 | 7/2005 | Pillar et al. | |
| 6,975,225 B2 * | 12/2005 | Privalov et al. | 340/539.26 |
| 6,991,041 B2 | 1/2006 | Laskaris et al. | |
| 6,993,421 B2 | 1/2006 | Pillar et al. | |
| 6,994,282 B2 | 2/2006 | Trapp et al. | |
| 7,006,902 B2 | 2/2006 | Archer et al. | |
| 7,024,296 B2 | 4/2006 | Squires | |
| 7,072,745 B2 | 7/2006 | Pillar et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,191,964 B2 | 3/2007 | Trapp | |
| 7,234,534 B2 | 6/2007 | Froland et al. | |
| 7,243,864 B2 | 7/2007 | Trapp et al. | |
| 7,254,468 B2 | 8/2007 | Pillar et al. | |
| 7,264,062 B1 * | 9/2007 | Ham | 169/52 |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,318,483 B2 | 1/2008 | Arvidson et al. | |
| 7,379,797 B2 | 5/2008 | Nasr et al. | |
| 7,389,826 B2 | 6/2008 | Linsmeier et al. | |
| 7,392,122 B2 | 6/2008 | Pillar et al. | |
| 7,412,307 B2 | 8/2008 | Pillar et al. | |
| 7,451,028 B2 | 11/2008 | Pillar et al. | |
| 7,522,979 B2 | 4/2009 | Pillar | |
| 7,555,369 B2 | 6/2009 | Pillar | |
| 7,571,662 B2 | 8/2009 | Pickering et al. | |
| 7,614,455 B2 | 11/2009 | Arvidson et al. | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,729,831 B2 | 6/2010 | Pillar | |
| 7,739,921 B1 | 6/2010 | Babcock | |
| 7,756,621 B2 | 7/2010 | Pillar et al. | |
| 7,784,554 B2 | 8/2010 | Grady et al. | |
| 7,792,618 B2 | 9/2010 | Quigley et al. | |
| 7,831,363 B2 | 11/2010 | Quigley | |
| 7,835,838 B2 | 11/2010 | Pillar et al. | |
| 7,848,857 B2 | 12/2010 | Nasr et al. | |
| 7,874,373 B2 | 1/2011 | Morrow et al. | |
| 7,878,703 B2 | 2/2011 | Roberts | |
| 7,889,187 B2 | 2/2011 | Freier et al. | |
| 7,954,508 B2 | 6/2011 | Doyle et al. | |
| 7,987,916 B2 | 8/2011 | Laskaris et al. | |
| 7,997,348 B2 | 8/2011 | Hosfield | |
| 8,000,850 B2 | 8/2011 | Nasr et al. | |
| 8,095,247 B2 | 1/2012 | Pillar et al. | |
| 8,162,619 B2 | 4/2012 | Laskaris | |
| 8,245,790 B2 | 8/2012 | Lozier | |
| 2001/0013555 A1 | 8/2001 | Egashira et al. | |
| 2003/0058114 A1 * | 3/2003 | Miller et al. | 340/577 |
| 2003/0130765 A1 | 7/2003 | Pillar et al. | |
| 2003/0158635 A1 * | 8/2003 | Pillar et al. | 701/1 |
| 2003/0195680 A1 | 10/2003 | Pillar | |
| 2004/0065450 A1 | 4/2004 | Yoshida | |
| 2004/0113770 A1 * | 6/2004 | Falk et al. | 340/531 |
| 2004/0133319 A1 | 7/2004 | Pillar et al. | |
| 2005/0077057 A1 | 4/2005 | Laskaris | |
| 2005/0113996 A1 | 5/2005 | Pillar et al. | |
| 2005/0209747 A1 * | 9/2005 | Yakes et al. | 701/22 |
| 2005/0222287 A1 | 10/2005 | Roberts | |
| 2006/0131038 A1 | 6/2006 | Lichtig | |
| 2006/0180321 A1 | 8/2006 | Yoshida | |
| 2006/0243324 A1 | 11/2006 | Klein et al. | |
| 2007/0061054 A1 | 3/2007 | Rowe et al. | |
| 2007/0164127 A1 | 7/2007 | Lozier et al. | |
| 2007/0242755 A1 * | 10/2007 | Ochoa | 375/242 |
| 2007/0261509 A1 | 11/2007 | Meyer et al. | |
| 2008/0035201 A1 | 2/2008 | Roberts | |
| 2008/0041599 A1 | 2/2008 | Mulkey et al. | |
| 2008/0059030 A1 | 3/2008 | Quigley et al. | |
| 2008/0088431 A1 * | 4/2008 | Sutardja et al. | 340/506 |
| 2008/0103651 A1 | 5/2008 | Pillar et al. | |
| 2008/0215190 A1 | 9/2008 | Pillar et al. | |
| 2008/0215700 A1 | 9/2008 | Pillar et al. | |
| 2008/0221741 A1 * | 9/2008 | Pillar et al. | 701/1 |
| 2008/0292472 A1 | 11/2008 | Laskaris | |
| 2009/0061891 A1 * | 3/2009 | Chung | 455/456.1 |
| 2009/0101368 A1 * | 4/2009 | Lozier | 169/56 |
| 2009/0218110 A1 | 9/2009 | Laskaris et al. | |
| 2009/0260836 A1 | 10/2009 | Laskaris et al. | |
| 2009/0277656 A1 | 11/2009 | Combs | |
| 2009/0313659 A1 * | 12/2009 | Samuels | 725/78 |
| 2010/0012332 A1 | 1/2010 | Fisher et al. | |
| 2010/0012333 A1 | 1/2010 | Fisher et al. | |
| 2010/0065286 A1 | 3/2010 | Hosfield | |
| 2010/0109866 A1 * | 5/2010 | Gavrila et al. | 340/540 |
| 2010/0274397 A1 | 10/2010 | Lozier et al. | |
| 2010/0301668 A1 * | 12/2010 | Yakes et al. | 307/9.1 |
| 2010/0319479 A1 | 12/2010 | Sjolin et al. | |
| 2011/0064591 A1 | 3/2011 | McLoughlin et al. | |
| 2011/0127051 A1 | 6/2011 | Guse | |
| 2011/0174383 A1 | 7/2011 | Combs | |
| 2011/0200461 A1 | 8/2011 | Christensen et al. | |
| 2011/0240317 A1 | 10/2011 | Laskaris et al. | |
| 2012/0012344 A1 | 1/2012 | McLoughlin et al. | |
| 2012/0061108 A1 | 3/2012 | Cerrano | |

FOREIGN PATENT DOCUMENTS

| | | |
|---|---|---|
| JP | 06-009659 | 2/1994 |
| JP | 8191899 | 7/1996 |
| JP | 2001276272 | 10/2001 |
| KR | 200197052 | 9/2000 |
| KR | 100706889 | 4/2007 |
| KR | 1020070036105 | 4/2007 |
| WO | WO03/055714 A1 | 7/2003 |
| WO | WO03/059455 A2 | 7/2003 |
| WO | WO03/060831 A2 | 7/2003 |
| WO | WO03/061235 A2 | 7/2003 |
| WO | WO2004/052756 A1 | 6/2004 |
| WO | WO2004/102105 A1 | 11/2004 |
| WO | WO2005/011943 A2 | 2/2005 |

(56) References Cited

FOREIGN PATENT DOCUMENTS

| | | |
|---|---|---|
| WO | WO2005/021099 A2 | 3/2005 |
| WO | WO2005/039936 A2 | 5/2005 |
| WO | WO2005/100463 A2 | 10/2005 |
| WO | WO2006/037100 A1 | 4/2006 |
| WO | WO2006/052792 A2 | 5/2006 |
| WO | WO2006/118777 A2 | 11/2006 |
| WO | WO2007/140179 A2 | 12/2007 |
| WO | WO2008/002963 A2 | 1/2008 |
| WO | WO2008/021918 A2 | 2/2008 |
| WO | WO2009/002799 A2 | 12/2008 |
| WO | WO2009/108395 A1 | 9/2009 |
| WO | WO2010/148162 A2 | 12/2010 |
| WO | WO2012/033920 A1 | 3/2012 |

OTHER PUBLICATIONS

PCT International Search Report dated Jan. 27, 2011 for corresponding PCT Application No. PCT/US2010/032010.

Webpage: STNews.com, New Monitor Position Indicator Safely Aims Water Stream at Fire, accessed Mar. 16, 2012

News Release, United States: Fire Department Gets New Truck, KCHW Newswire, Aug. 21, 2010, Euclid Infotech Private Ltd.

Webpage: KZ Valve.com, Motorized Valves and Controls, accessed Mar. 26, 2012.

Webpage: Fire Apparatus, Monitors Becoming More Efficient, Easier to Control, Fire Apparatus Magazine, accessed Apr. 9, 2012.

Webpage: Hale, www.haleproducts.com, accessed Mar. 26, 2012.

* cited by examiner

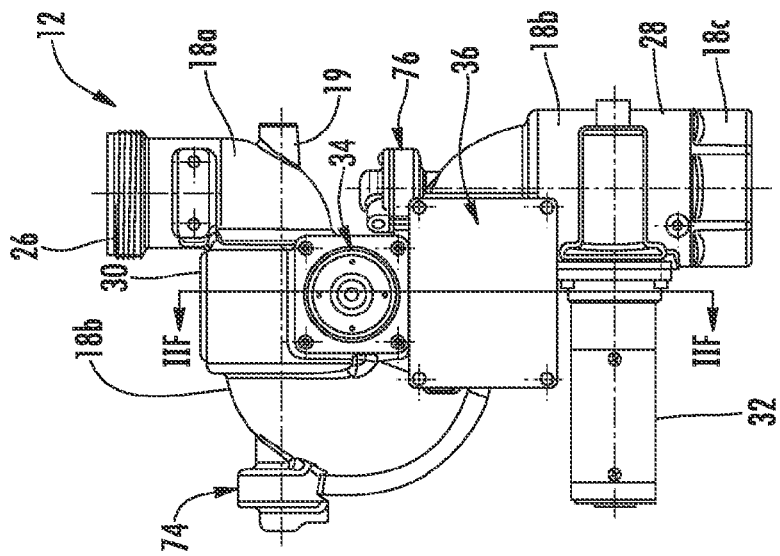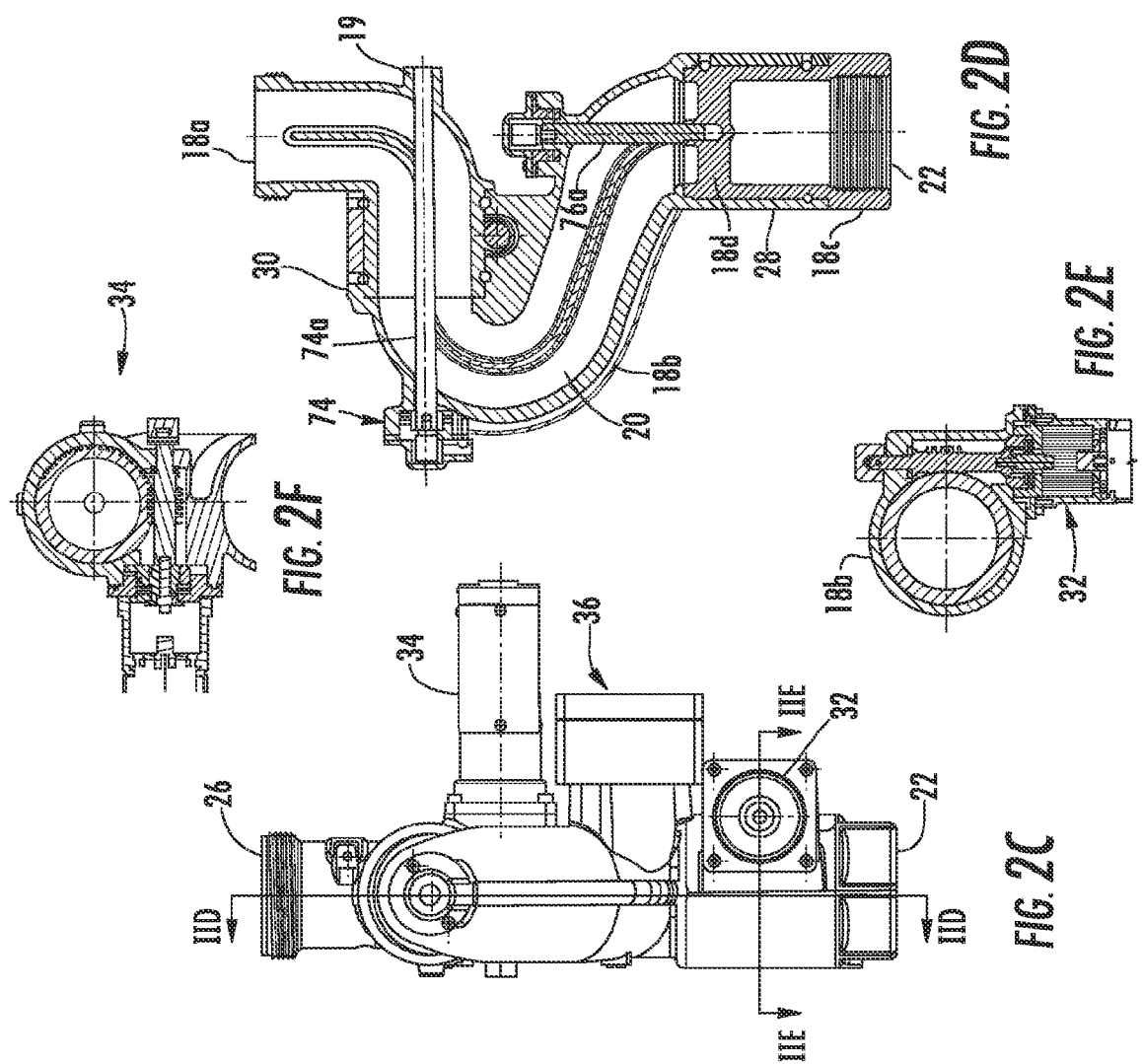

| NO. | PART NO. | PART NAME | REQ. |
|---|---|---|---|
| 38 | 31011000 | FITTING-GREASE (3/16) | 2 |
| 37 | 71513000 | WASHER-THRUST (⌀.625) | 4 |
| 36 | 15699000 | BEARING-NEEDLE THRUST (⌀.625) | 2 |
| 35 |  | O-RING (-XXX) | 2 |
| 34 | 57337000 | O-RING (-025) | 2 |
| 33 | 17707001 | BEARING-BUSHING | 2 |
| 32 | 57295000 | O-RING (-016) | 2 |
| 31 | 65658001 | SHAFT-WORM | 2 |
| 30 | 17702000 | BEARING-NEEDLE THRUST (⌀.312) | 2 |
| 29 | 71516000 | WASHER-THRUST (⌀.312) | 4 |
| 28 | 57380000 | O-RING (-008) | 2 |
| 27 | 51248000 | PIN-ROLL | 2 |
| 26 | 47652001 | NUT-MANUAL OVERRIDE | 2 |
| 25 | 17804001 | BASE-MONITOR | 1 |
| 24 |  | MOTOR-GEAR | 2 |
| 23 | 65855001 | SHAFT-LEFT/RIGHT THRUST | 1 |
| 22 |  | O-RING (-040) | 1 |
| 21 | 11958001 | ADAPTER-SENSOR HEX DRIVE | 2 |
| 20 | 71518000 | WASHER-THRUST (⌀0.750) | 2 |
| 19 | 17705000 | BEARING-NEEDLE THRUST (⌀0.750) | 2 |
| 18 | 52855001 | PLATE-CABLE CLAMP | 1 |
| 17 | 61076000 | #8-32 X .375 L BTN CAP SCR | 1 |
| 16 |  | LOOM-WIRE, SPLIT (⌀3/8) | 1 |
| 15 | 47637001 | NUT-BEARING ADJUSTING | 2 |
| 14 | 57327000 | O-RING (-024) | 2 |
| 13 | 11957001 | ADAPTER-SENSOR MOUNTING | 2 |
| 12 | 57476000 | O-RING (-020) | 2 |
| 11 |  | SENSOR-VERT-X 1302 | 2 |
| 10 | 23665001 | COVER-SENSOR | 2 |
| 9 |  | #8-32 X .50 L BTN CAP SCR | 4 |
| 8 | 64074000 | #10-32 X .50L SOC CAP SCR | 8 |
| 7 | 57298000 | O-RING (-012) | 3 |
| 6 | 65856001 | SHAFT-UP/DOWN THRUST | 1 |
| 5 | 16251001 | BODY-MONITOR INLET | 1 |
| 4 | 15027000 | BALLS0⌀0.250 SS |  |
| 3 | 28146001 | ELBOW-DISCHARGE | 1 |
| 2 | 63687000 | SCREW-SET (BLACK NYLON) 5/16-18 x .187 LG, SLT HD | 4 |
| 1 | 57547000 | O-RING (-039) | 1 |

FIG. 2G

FIREFIGHTING MONITOR AND CONTROL SYSTEM THEREFOR

CROSS-REFERENCE TO RELATED APPLICATIONS

This application claims priority and the benefit of provisional application entitled FIREFIGHTING MONITOR AND CONTROL SYSTEM THEREFOR, Ser. No. 61/171,700, filed Apr. 22, 2009, which is incorporated herein by reference in its entirety The present invention relates to a firefighting monitor and, more particularly, to a firefighting monitor with a control system for controlling various parameters associated with the firefighting monitor.

TECHNICAL FIELD AND BACKGROUND OF THE INVENTION

Firefighting monitors are used to control the flow of fluid, such as water, and are typically formed from curved pipe sections that form an outlet (to which a nozzle is mounted) and an inlet that connects to a supply of fluid. The pipe sections are connected together to form a curved fluid passageway and mounted to allow articulation of the pipe sections so that the position of the outlet can be varied.

Monitors may be controlled manually or may be driven by motors, which are either hardwired or connected via radio frequency transmission to a controller. Each driven version of monitor typically has a separate physical configuration based on the communication format that is desired. Additionally, driven monitors may be configured with different motor speeds. For example, most monitors have pipe sections that rotate about vertical and horizontal axes of rotation. Optionally, each axis of rotation may have a different motor speed to tailor the travel speeds of the outlet to the particular application. For example, for a monitor that is mounted for washing railroad cars, it may be desirable to have a fast horizontal motor for the left to right sweep and a slow vertical motor because of the limited vertical up and down travel that is needed.

In addition to the different motors and different communication formats, monitors often need different stow configurations and set limits on their range of motion. Many of these operational characteristics must be manually set. In addition to the stowed position and travel limits, in the case of a radio frequency communication version the RFID must be set. Further, when using more than one control input device, control protocols must be set. Also, most controls have resident firmware. When firmware updates are required, these updates typically require physical change to the control board of the respective controls.

Accordingly, while current monitors are becoming more and more customizable and, hence, specialized in their application each modification requires some sort of manual adjustment or setting. This can add to inventory requirements and the cost to the users.

SUMMARY OF THE INVENTION

Accordingly, the present invention provides a firefighting monitor and control system that allows a monitor to be reconfigured without requiring manual adjustments to the monitor or its control devices. In this manner, a single monitor and its associated control input devices may be configured and then reconfigured for multiple applications.

In one form of the invention, a firefighting monitor system includes a monitor, a controller for selectively generating signals to the monitor for controlling the monitor, and a computer. The computer is configured to receive input from a user relative to the monitor or the controller and generates an output based on the input, which is then transmitted to the controller for controlling the monitor or the controller in accordance with the output from the computer.

In one aspect, the system further includes a portable storage device. The computer is adapted to communicate with the portable storage device for storing the output in the portable storage device. The controller is also adapted to communicate with the portable storage device so that the output can be transmitted to the controller by the portable storage device.

In a further aspect, the controller also includes user actuatable input devices, such as buttons or switches, so that a user may control the monitor with the controller and optionally in a manner consistent with the output from the computer.

In other aspects, the monitor includes an actuator for changing the position or configuration of a portion of the monitor, and the controller selectively generates signals for controlling the actuator based on the output. For example, the monitor may include an inlet and an outlet, with the actuator selectively positioning the outlet relative to the inlet. Further, the monitor may include two actuators, with one actuator changing the position of the outlet relative to the inlet about a first axis, and the other actuator changing the position of the outlet relative to the inlet about a second axis. The controller then selectively controls the two actuators based on the output. For example, the first axis may comprise a vertical axis, and the second axis may comprise a horizontal axis.

In other aspects, the actuator selectively controls the shape of the stream through the nozzle.

According to yet other aspects, the actuator may have a variable speed motor with a motor speed, and the output may include parameters relating to the speed of the motor. For example, the motor may have selectable speeds (e.g. select between fast, medium, and slow etc speeds) or may be proportionally varied, for example by a variable input control, such as a joystick. The controller is then able to adjust the motor speed based on the output.

In any of the above systems, the monitor may also have an adjustable travel limit, with the controller adjusting the travel limit based on the output. In another aspect, the monitor may have an adjustable stowed position, with the controller adjusting the stowed position based on the output.

According to yet further aspects, the controller comprises a remote controller, and the monitor includes a monitor-based controller and a receiver. The remote controller communicates with the receiver via a radio frequency signal, a serial bus signal, or a CANbus signal. Additionally, the remote controller may be configurable between generating a radio frequency signal, a serial bus signal, or a CANbus signal for communicating with the receiver, which may be based on the output from the computer.

Also, in any of the above monitors, the controller includes programming which can be updated based on the output from the computer.

In yet other aspects, the system includes two or more remote controllers, and the output may set the priority between the remote controllers. In addition, each remote controller may have different communication formats. For example, the controllers may each have both CAN bus output and an RF receiver and optionally also provide serial communication. In this manner, a control unit may communicate with another control unit using one format and communicate with yet another control unit with another format. Accordingly, the present invention provides monitor that can be quickly and easily modified to suit a variety of different applications through a centralized system to facilitate the initial setting up of the monitor and also to allow the monitor to be reconfigured without requiring manual adjustments to the monitor or its respective controllers.

These and other objects, advantages, purposes, and features of the invention will become more apparent from the study of the following description taken in conjunction with the drawings.

DETAILED DESCRIPTION OF THE DRAWINGS

FIG. 2A-2F are enlarged views of the monitor of FIG. 1;

FIG. 2G is a parts list for the components shown in FIGS. 2A-2F;

DETAILED DESCRIPTION OF THE PREFERRED EMBODIMENTS

Figure 1:
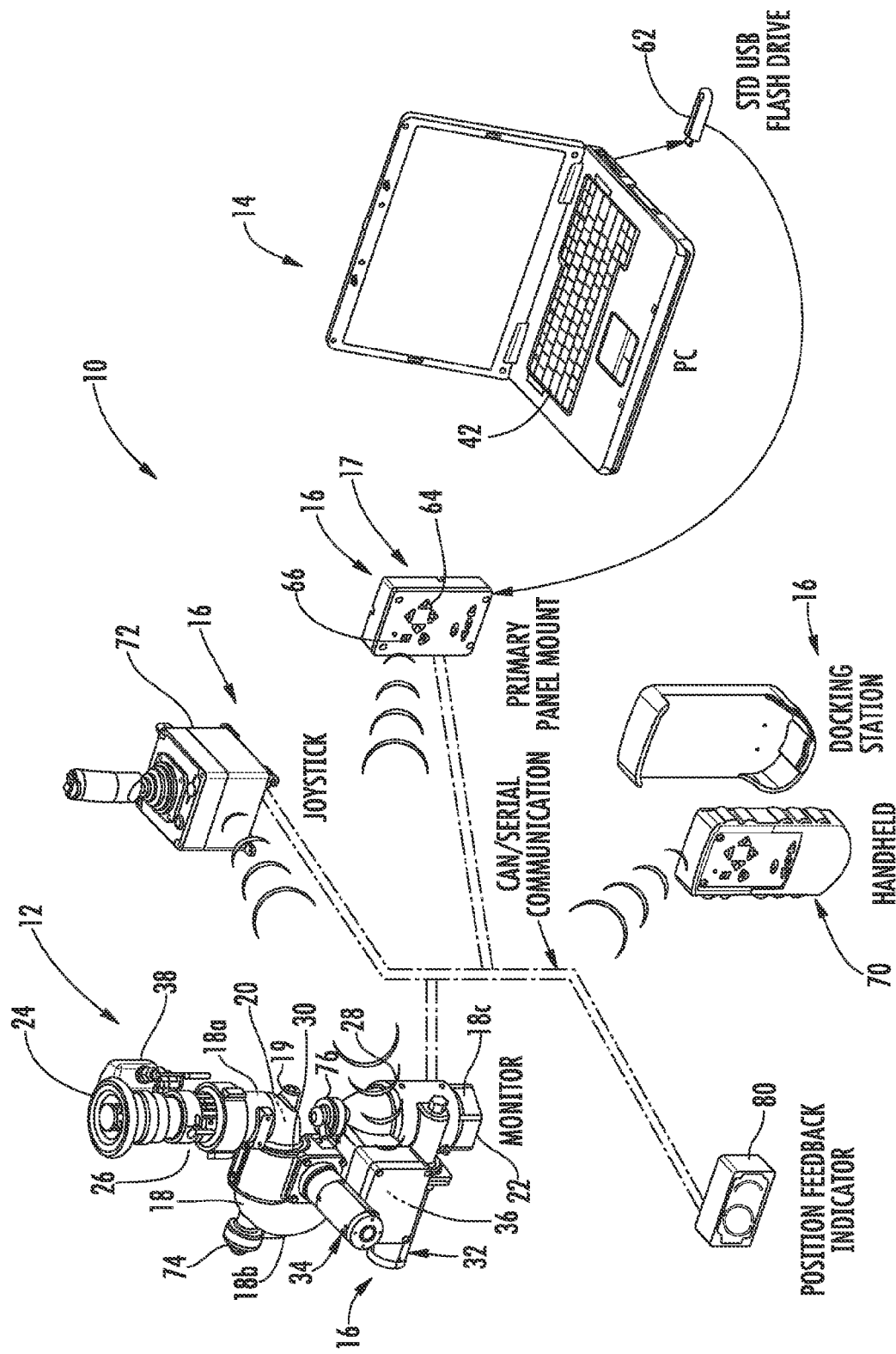
FIG. 1 is a schematic representation of a firefighting monitor and control system of the present invention.
Figure 2A:
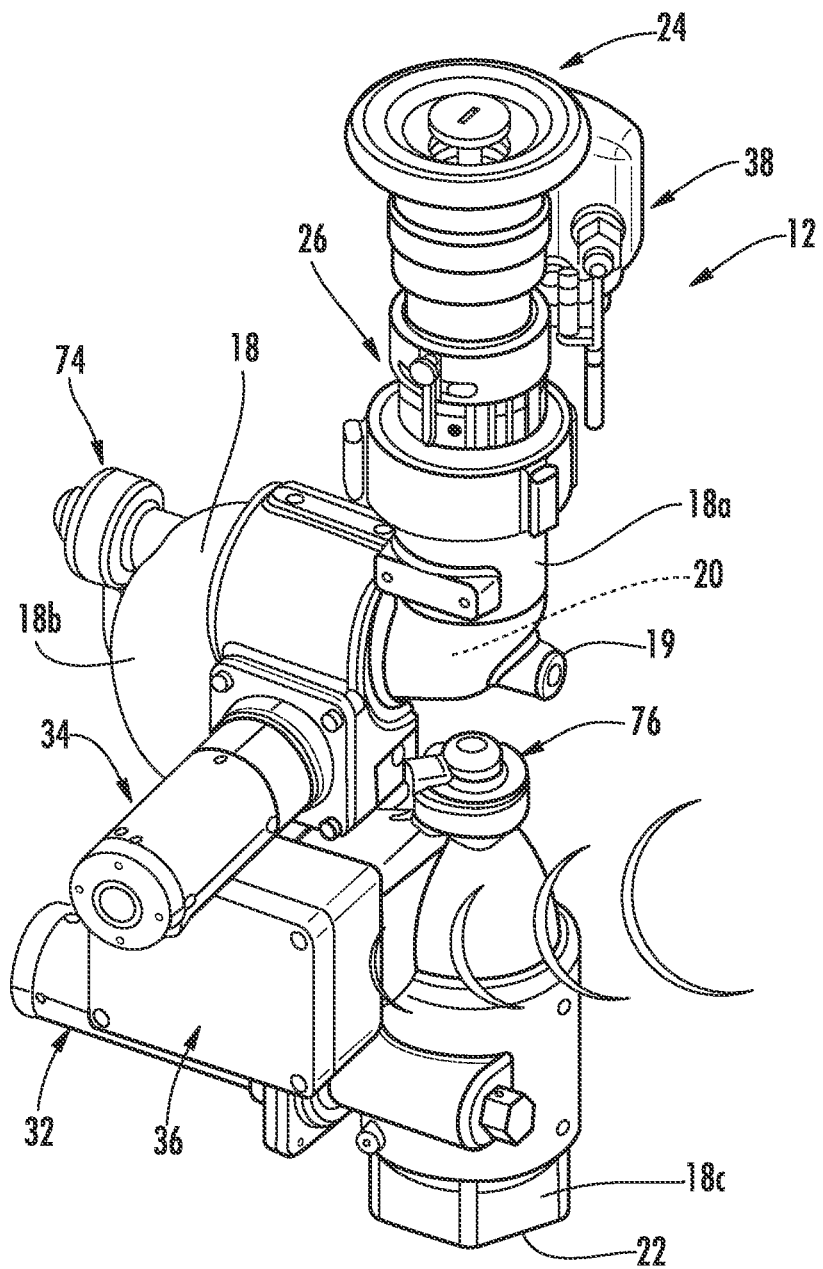

Referring to FIG. 1, the numeral 10 generally designates a firefighting monitor and control system of the present invention. As will be more fully described below, firefighting monitor and control system 10 includes a monitor 12 and a computer 14, which is configured to allow the parameters of the monitor 12 (and its associated controllers) to be selected and modified based on a user's needs so that the monitor can be customized by the user. As will be more fully described below, computer 14 includes a software program that generates a menu to allow a user to select the different parameters of the monitor and, further, of the monitor's input control devices 16 (e.g. panel mounted control unit 17, monitor based control unit 36, handheld control unit 70, and joystick control unit 72, all described below) to be customized and then modified as needed.

Although system 10 is illustrated with a single panel mounted control unit 17, monitor based control unit 36, handheld control unit 70, and joystick control unit 72, it should be understood that multiple panel mounted control units (e.g. truck mounted panels), handheld units and joystick units may be used for each monitor. Further, multiple monitors may be used. In the case of multiple panels mounted control units, there will typically be primary and secondary versions of the panel mounted control unit (primary would have a controller with built in buttons), and for the secondary version the buttons may be optional. In the secondary version there may be a harness hook up to allow for example, the OEM to provide input from their own devices, such as switches. In the case of multiple monitors, each monitor's unique address can be sub addressed. This may be helpful when there are two monitors on a truck, and each monitor is configured differently (e.g. a left or right bumper monitor and an above cab monitor scenario). By using binary ground code across two lines in the monitor power harness, each monitor can be distinguished and the appropriate stored configuration is activated, and the appropriate listening address for the control commands may be used.

Referring to FIGS. 2A-2D, monitor 12 includes a plurality of pipe sections 18, which are interconnected by a plurality of pivot joints or connections to form a curved flow path 20 from an inlet 22, which connects to a water supply, through a nozzle 24 provided at the outlet end 26 of the pipe sections. The various pipe sections are pivoted about their respective pivot joints 28 and 30 by actuators 32 and 34 in the form of motors. Suitable motors comprise sealed motors, which are available from Allied Motion. The motors are each controlled by monitor based control unit 36, which is mounted at the inlet end of the pipe sections, and which controls the motors in response to signals received from panel mount control unit 17. In the illustrated embodiment, panel mount control unit 17 communicates with monitor base controller 36 through RF communication, though as will be more fully described below control unit 17 may be reconfigured to communicate with control unit 36 via serial or CANbus communication.

Monitor 12 optionally includes a third actuator 38 in the form of a third motor, which controls the stream through a variable stream nozzle 24, and which also may be controlled by monitor based control unit 36 in response to signals from remote panel mount control unit 17. Suitable nozzles may include low, mid, or high flow nozzles with variable or fixed flows. For example, the nozzle may incorporate a variable stem such as disclosed in U.S. patent application entitled NOZZLE ASSEMBLY, Ser. No. 12/370,372, filing date Feb. 12, 2009, which is incorporated herein in its entirety. For example, a suitable commercially available nozzle may include the RAN nozzle, available from Elkhart Brass Manufacturing of Elkhart, Ind., which includes an integral stream shaper and, further, an optional foam tube attachment.

As noted above, computer 14 may be used to modify the configuration of monitor 12 and/or control units 16. Referring now to FIGS. 3-8, as noted above, computer 14 is includes a computer software program that generates creates a pull-down menu for selecting or adjusting various settings or parameters on monitor 12 and also on control units 16. In the illustrated embodiment, the software program generates a plurality of selectable tabs 40a, 40b, 40c, 40d, 40e, 40f, and 40g, with each tab associated with one or more attributes or parameters of the monitor or control unit. Using a user actuatable input device, such as the computer keyboard 42 (or a mouse), the user may select one of the tabs, which then opens up a window 44 associated with each tab.

Figure 3:
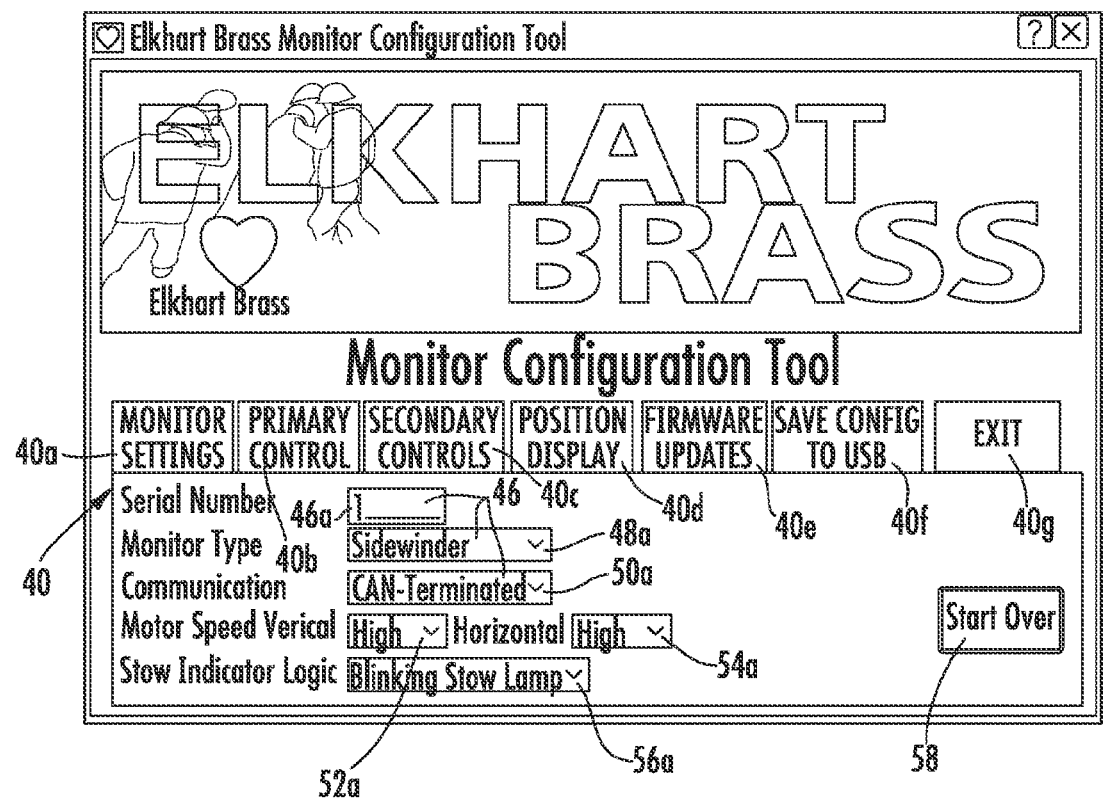
FIGS. 3-8 are screen shots of the user interface for selecting the configuration of the monitor.

For example, referring to FIG. 3, tab 40a is associated with the monitor setting and includes a window with a plurality of text boxes associated with an equal plurality of parameters, which are listed as shown to the left of the text box. For example, in the illustrated embodiment, window 44a associated with tab 40a includes a text box for the serial number of the monitor, for the monitor type, for the communication type, for the motor speed in the vertical direction, for the motor speed for the horizontal direction, and the stow indicator logic. The text boxes further may provide a pull-down menu, for example which lists the type of monitor, the type of communication, the type of motor speed and the type of stow indicator logic. In this manner, the user may insert the serial number in text box 46a and select from the various menus in text boxes 48a, 50a, 52a, 54a, and 56a. Window 44a optionally includes a screen button 58a to allow the user to start over. It should be understood that the type of parameters and that the number of selections for each pull down menu may be varied and the examples provided herein are only exemplary.

Figure 4:
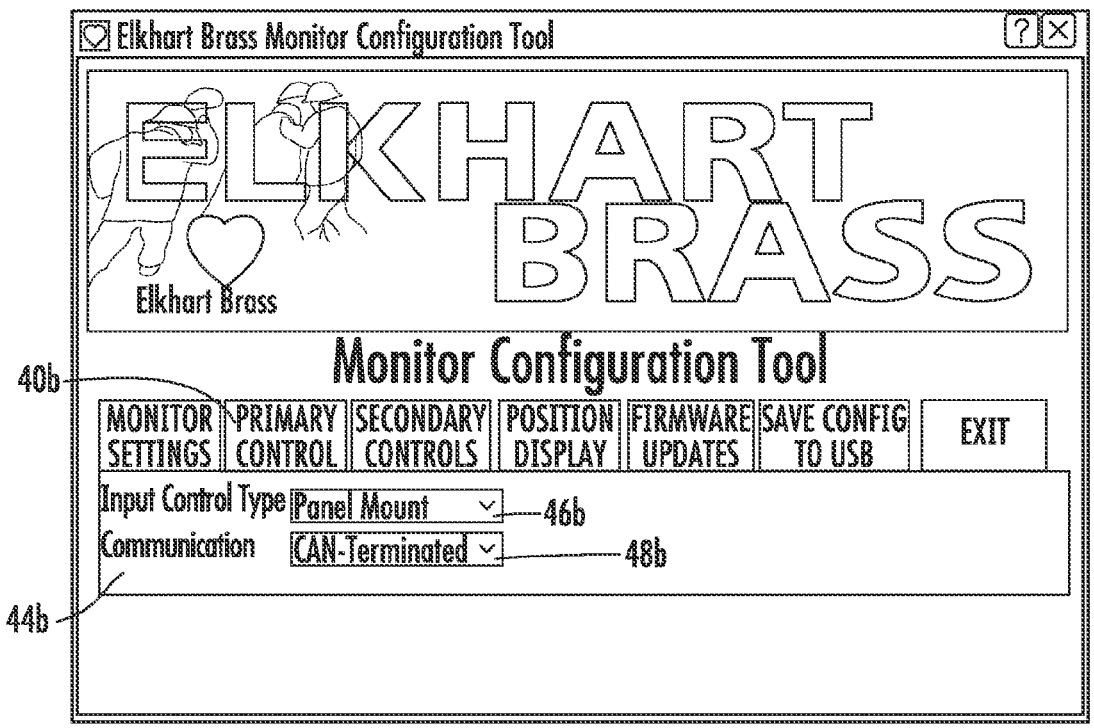

Referring to FIG. 4, tab 40b is associated with the type of primary control. For example, when tab 40b is selected window 44b is generated by the software, which includes two text boxes with pull-down menus 46b and 48b, for example for the primary input control type and the type of communication.

Figure 5:
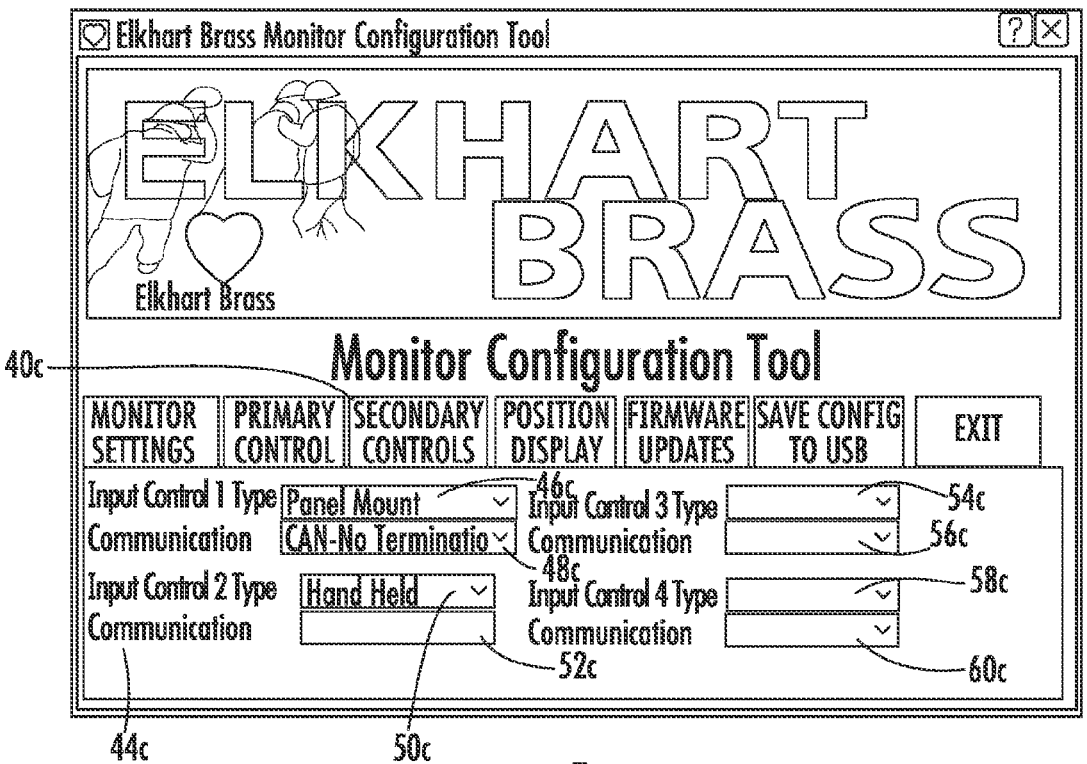

Referring to FIG. 5, tab 40c is associated with secondary controls and when selected, the software displays a window 44c that similarly includes a plurality of text boxes 46c, 48c, 50c, 52c, 54c, 56c, and 58c. As best understood from the window 44c, this feature allows a user to select the secondary control units that may be configured to control monitor 12. For example, text boxes 46c and 48c are provided to identify an input control type and the type of communication for that input device. Similarly, the remaining text boxes provide a selection of other input control types and their respective type of communications. For example, the controls may include controls available from Elkhart Brass or third party controls, for example controls that can generate a CAN or serial signal, or the like, can be integrated into the system.

Figure 6:
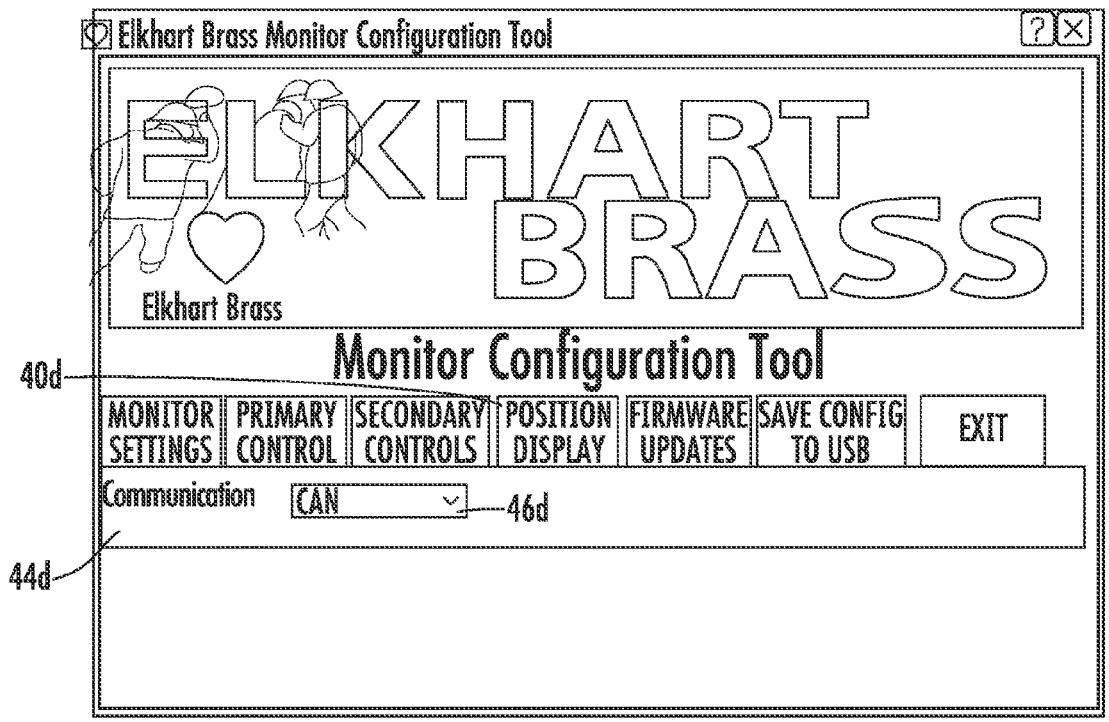

Referring to FIG. 6, tab 40d is associated with the position of the position display. When position display tab 40d is selected, the computer software generates a window 44d with a text box 46d to indicate the type of communication for the position display. Again, in the illustrated embodiment, text box 46d provides a pull-down menu.

Figure 7:
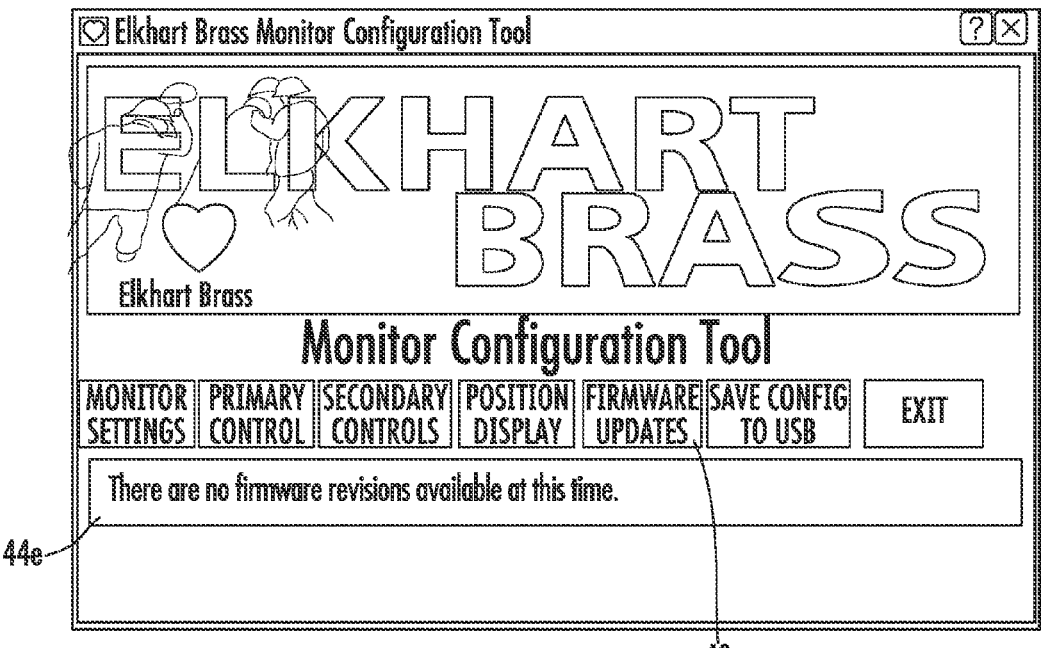
Figure 8:
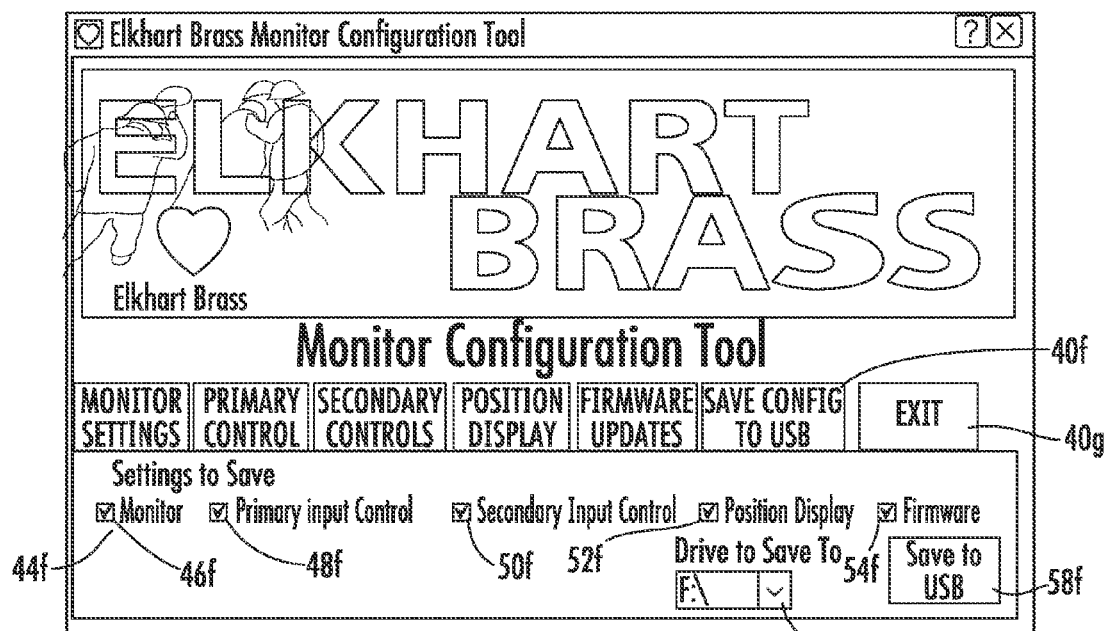

With reference to FIG. 7, tab 40e is associated with firmware updates that may be provided for the various control units associated with monitor 12, more fully described below. When the user selects tab 40e, a window 44e is generated by the software which indicates if there are firmware revisions currently available, which may be displayed in a similar text box fashion or a check box display style shown in FIG. 9.

Figure 9:
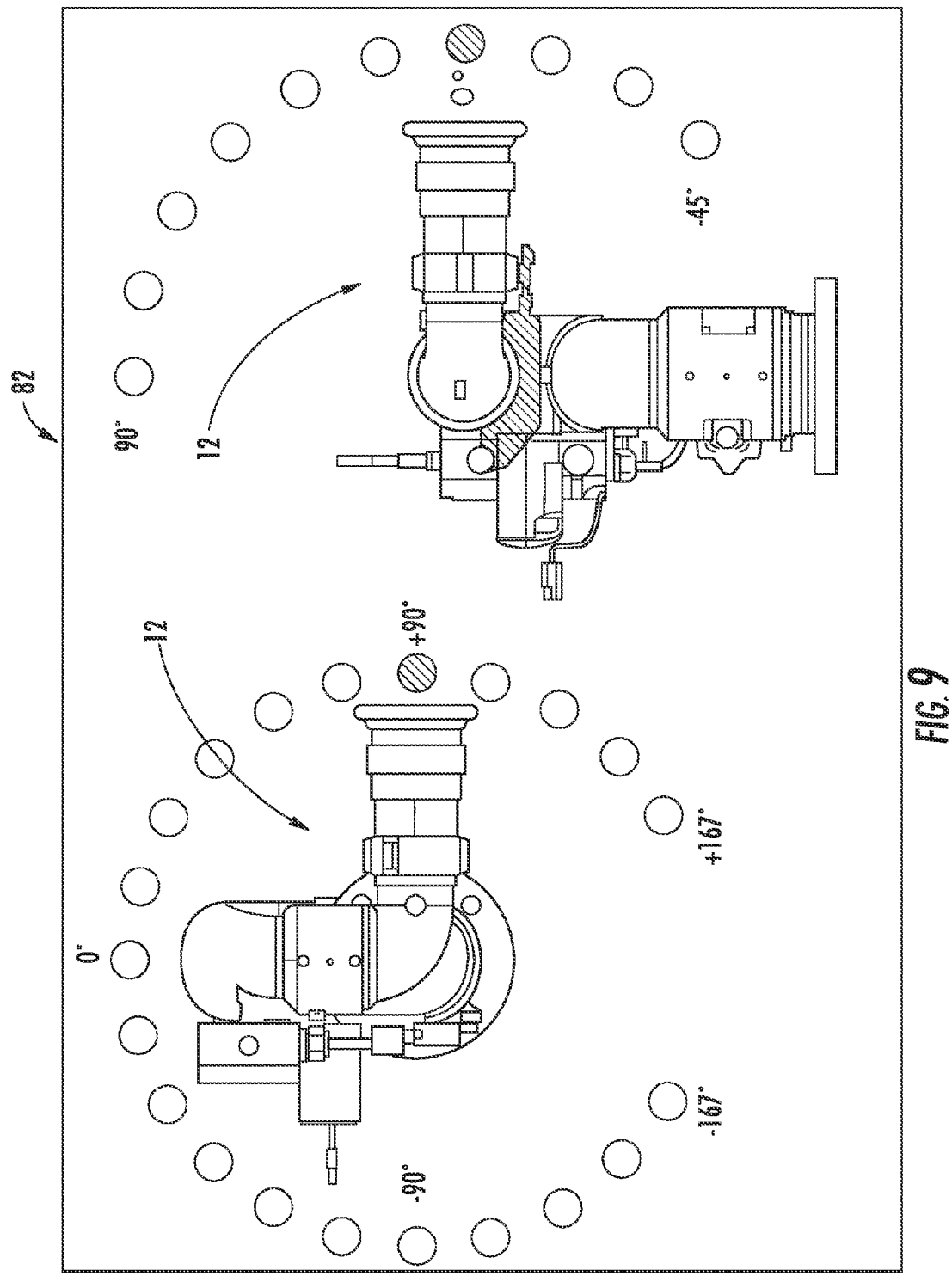
FIG. 9 is a schematic drawing of an in-cab position display illustrating the position of the monitor about both the horizontal and vertical axes.

Referring to FIG. 9, when tab 40f is selected, the software program generates window listing each of the preceding groups of parameters so that a user may select which groups or sets of parameters are to be saved to a portable storage device, such as a USB device, for transmitting to control unit 17. When tab 40f is selected, the software generates a window 44f listing each of the groups of parameters associated with each of the previous tabs and an associated check box 46f, 48f, 50f, 52f, and 54f, which when checked indicates that the parameters chosen in the previous windows are to be saved to the USB device. Further, an additional text box 46f may be provided to identify the location where the computer software can save the settings. Optionally, an additional tab or visual button 58f may be provided, which initiates the software to save the various settings to the USB device. Also provided is a tab 40g to allow the user to exit the program.

Once the various settings are selected by the user using keyboard 42 (or a mouse) and they are saved to USB device 62, the USB device 62 may then be removed from computer 14 and then inserted into a USB port provided on control unit 17 to thereby upload the settings to the control unit. The control unit 17 may then download the settings from USB device 62 and store the settings in a memory device also provided in control unit 17, more fully described below. In response to receiving the settings, control unit 17 then transmits the settings to the appropriate devices in system 10, more fully described below. For example, the settings may include travel limits, "keep out zones" (e.g. no travel zones), stow position, calibration, and motor speed or the like. The settings in the monitor based control unit may also be programmed by the other monitor input control devices, for example the hand held device 70.

Referring again to FIG. 1, control unit 17 is illustrated as a panel mount control unit and, further, which communicates with the monitor base control unit 36 via RF communication and/or CANbus communication depending on the configuration of control unit 36. For example, where control unit 36 does not include a receiver, the control unit may use the CANbus for communication with unit 36. It should also be understood that control unit 17 may be configured to provide serial communication as well. Where unit 36 includes a receiver, control unit 17 therefore may be configured either way to communicate with the monitor based control unit.

Control unit 17 comprises a microprocessor based control unit and, further, includes user actuatable input devices 64 in communication with the control unit controller (microprocessor and memory device) that allow a user to control monitor 12. For example, user actuable devices 64 may comprise buttons, which are associated with the actuation of motors 32, 34, and 38 to thereby control the positioning of nozzle 24 relative to the inlet of the monitor and the stream from nozzle 24. As previously noted, when USB device 62 has been used to download the user selected parameters for controlling monitor 12 and, further, for control unit 17, control unit 17 controls the motors 32, 34, 38 based on the parameters provided by USB port device 62. For example, as noted above, a user may select the speed in both respective motors so that when a user activates one of the motors using one of the user's input devices 64, control unit 17 will send drive signals to the respective motors based on the speed selections chosen by the user and transmitted from computer 14 to control unit 17 by USB port device 62. Furthermore, control unit 17 may include a user actuatable device 66, such as a button, which when activated generates a signal to control unit 36 to return the monitor to its stow configuration, which may be stored in the memory device of control unit 17 or monitor based control unit 36. The control unit 36 then actuates the motors to move the monitor to its stow position using a position feedback loop provided by sensors described more fully below. Furthermore, similar to the speed of the motors, the stow position may be modified based on the parameters stored in USB port device and then transmitted to control unit 17 when USB port device 62 is plugged into the USB port on control unit 17.

In addition to control unit 17, as noted above monitor 12 may be controlled using additional or secondary controls. For example, system 10 may include one or more handheld controllers 70 and one or more joystick controllers 72. In addition, one of the joystick controls may be set as a primary control. Each of the respective additional controls may also be configured based on parameters transmitted to control unit 17 by USB port device 62. For example, the selections made by the user, for example as shown in FIG. 5, may include the type of input control unit and, further, the type of communication used by the input control unit. In the illustrated embodiment, handheld device 70 comprises an RF handheld device so that when a handheld device is selected by the user using the software program all the parameters associated with the handheld device are bundled along with the selection of the type of handheld device and, therefore, no type of communication need be selected. In other situations, when identifying a secondary panel mounted control unit 17, for example, in window 44c the control unit is identified as a panel mount and, further, as shown, is indicated as having CAN communication but with no termination. Since two panel mounted control units may be used, the primary panel mount control unit is identified and selected in window 44b as the primary input control unit.

In addition to the secondary controls, the type of communication provided by the primary control is identified in window 44b, as previously noted. Therefore, during the initial setup, the primary control (shown as control unit 17) self-configures based on the selected parameters stored and transmitted to control unit 17 by USB device 62. Further, control unit 17 transmits the prescribed parameters for the secondary controls to monitor based control unit 36 and to the respective remote control units so that each unit self configures so that it knows it is sending/receiving serial, CANbus, or RF communication signals. For example, if RF communication is used, an RFID identification is stored or registered on the respective control units. For serial communication, the switching format may be selected. For example, if the controller is making a ground contact to activate the command, the switching format is selected as a low side switching. If the control is passing the power signal to activate a command, the switching format is selected as a high side switching format.

Further, the control units may be configured with multiple formats. In the case of a panel mount control unit, for example, the panel mount control unit can have both CAN bus output and an RF receiver, as shown, such that the panel mount control unit may receive input from another remote control unit, such as a handheld device, and then forward it onto the monitor via a CANbus communication. In this manner, the monitor need not have a receiver.

As noted above, the stow position may be modified by the prescribed parameters stored in USB device 62. The stow position is accomplished via position feedback provided by sensors 74 and 76 mounted to the monitor. For example, suitable sensors include potentiometer sensors, including sealed hall effect position sensors available from CTS, which detect the position of the outlet around the respective axes. For an example of a suitable sensor mounting arrangement, reference is made herein to copending U.S. application entitled FIRE FIGHTING FLUID DELIVERY DEVICE WITH SENSOR, Ser. No. 11/853,278, filed Sep. 11, 2007, which is hereby incorporated by reference in its entirety.

Referring again to FIG. 2, sensors 74 and 76 are mounted to monitor 12 and are respectively mounted about the horizontal and rotational axis of the monitor. In the illustrated embodiment, each of the sensors includes a shaft, which when rotates relative to its sensor housing provides a direct indication of the position of the shaft and hence the structure to which it is attached. In the illustrated embodiment, shaft 74*a* of sensor 74 extends into intermediate pipe section 18*b* and through outlet pipe section 18*a* and is fixed at its distal end in a boss 19 formed in outlet pipe section. The sensor housing, on the other hand, is mounted to intermediate pipe section 18*b* so that when outlet pipe section pivots about its horizontal pivot axis, sensor 74 will provide direct feedback on the position of the monitor outlet about the horizontal axis. Similarly, sensor 76 includes a shaft 76*a* that extends into intermediate pipe section 18*b* and through the monitor base 18*c* and is fixed at its distal end in a vane 18*d* formed in base 18*c*. The sensor housing is mounted to intermediate pipe section 18*b* so that when intermediate pipe 18*b* pivots about its vertical pivot axis about base 18*c*, sensor 76 will provide direct feedback on the position of the monitor outlet about the vertical axis. For further details of the pivot connections for and how the motors drive the pipe sections about their respective axes, reference is made to U.S. Pat. No. 7,243,864, which is commonly owned by Elkhart Brass Manufacturing, and which is incorporated by reference in its entirety herein.

The sensors, which are coupled to the monitor base control unit 36, therefore provide direct position feedback to the control system so that the respective positions of the articulatable portions of the monitor may be monitored and accurately determined. Furthermore, with this information, control unit 36 and 16 may then drive the respective motors until the monitor is moved to the position associated with the preselected stow position. Further, this enables the stow position to be set and modified using the computer and computer software, based on the selections made by the user.

In addition to adjusting the stow position of the monitor, as noted above the oscillation limits, travel limits, and keep out limits of the monitor may be selected and again selected on computer 14 using the drop-down menu and, further, stored on USB port device 62 for transmission to control unit 16. By using the sensors to provide position feedback, infinite travel can be established for maximizing customization to installation peculiarities. Stow Position, Oscillate limits, Travel Limits, Keep Out Limits can all be set by a sequence of button pushes on the controllers as well (fixed and hand held). Further, the restricted travel area does not have to be at the end of the travel and instead can be programmed anywhere in the allowable horizontal/vertical travel zone.

System 10 may also include a position feedback indicator 80 (FIG. 1). Position feedback indicator 80 may be connected to monitor base control unit 36 using a CAN or serial communication, with its settings again selected by a user at computer 14. For example, the indicator may have one or more lights, such as LEDs, that may be configured to blink to indicate when the monitor has reached its desired position or blink to indicate that the monitor has still not been moved to its desired position-when the monitor then reaches its desired position the lights may stay or on turn off. In the illustrated embodiment, the indicator includes two sets of lights, with one set of lights illuminated when the monitor has reached its desired position and other illuminated when monitor is moving toward its target position. Again the format for the indicator may be selected or modified using computer 14.

As referenced above, monitor based control unit 36 may be configured for CAN, serial, or "plug in" RF communication and may, therefore, include a receiver. For example, a suitable receiver may include an AEROCOMM receiver. Control unit 36 also includes a controller. A suitable controller includes an integrated UBEC1 control, which allows for variable voltage input range, for example, a 10 to 30 volt input range, and built in diagnostics capability. Furthermore, the control unit includes a storage device for storing firmware, which allows for programmable motor speed selection, built-in diagnostics capability, and stow position flexibility based on absolute position indication provided by sensors 74 and 76.

Control unit 17 similarly, as understood from the above description, includes a communication system that can be configured for CAN, serial, or "plug in" RF communication. Further, control unit 17 includes an integrated controller such as a UBCEC1 control, which as noted provides a variable input voltage range, for example 10 to 30 volt input range, a transmitter or transceiver, and a storage device for storing built-in diagnostics and firmware. As noted above, control unit 17 may include a plurality of user actuatable devices, such as buttons 64 and 66, and further may also incorporate lights, such as LEDs, to indicate when a function is selected to thereby provide feedback for all activated functions.

Joystick 72 also may be configured between a CAN, serial, or "plug in" RF communication configuration or protocol and, further, includes a controller such as an integrated UBCEC1 control. Again, this provide a variable voltage input range such as a 10 to 30 volts and, further, provides storage for built-in diagnostics and storage of firmware. A suitable joystick may comprise a Rosenbaur style joystick that provides multiple control functions at the tip of the stick and, further LED feedback for command input.

A suitable handheld remote control unit also includes a controller, such as an integrated UBCEC1 control, and user interface input devices, such as buttons or a touch screen, and further may include batteries, including rechargeable batteries. In addition, handheld unit 70 may be provided with in a docking station, with an optional charging station at the docking station.

Optionally, system 10 may also incorporate a position feedback in-cab display 82, such as an LED display for displaying horizontal and vertical position (including nongraphic display) of the monitor, which is mounted for example in the cab of a truck. The display may be wired via CAN or serial communication to control unit 16 and provides information to a person positioned in the cab of a fire truck, for example. The display may be reconfigured to suit the user's preferences. For example, as shown in FIG. 9, the display 82 may have graphical representations of the monitor that are located in 360 degree templates with indicators for angular increments around the 360 degree circumference of the template. The graphical representations of the monitor may have moving component parts that move in response to movement of the monitor to show the configuration of the monitor about both axes. Alternately or in addition the indicators for the angular increments may light up to show the orientation of the monitor's outlet. For another example of a suitable display reference is made to U.S. patent application entitled FIREFIGHTING DEVICE FEEDBACK CONTROL, Ser. No. 12/174,866, filed Jul. 17, 2008, which is commonly owned by Elkhart Brass Manufacturing of Elkhart Ind. and which is hereby incorporated by reference in its entirety herein.

Optionally, control unit 36 may be stored in a housing and, further, a housing with a clear lid to allow the LED's mounted to the circuit board to show through. Given the compact size of the control unit housing, the housing may be mounted to the monitor base as shown in FIG. 1, which streamlines wiring. As noted above, the control unit has stored therein firmware, which will be configured to restrict vertical downward travel around the control housing at the extreme ends of the horizontal travel limits.

As noted above, the software program stored in computer 14 may also allow firmware updates to be made, for example, via USB device 62. These firmware updates may be transmitted to the computer, for example, by downloading firmware updates directly, for example, from a website, which updates are then uploaded to the control unit 17 and in turn transmitted to various control units via the selected protocol from control unit 17. Similarly, the firmware is configured to allow diagnostic files to be downloaded to control unit 17 and in turn uploaded to USB device 62, which allows the diagnostic files to be forwarded from computer 14 for analysis. For example, diagnostic files may track monitor performance and generate error messages if the monitor is not working properly, and also may capture errors in a diagnostic file along with the basic monitor system configuration.

While several forms of the invention have been shown and described, other forms will now be apparent to those skilled in the art. As noted, the monitor Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A firefighting monitor system comprising:
   a monitor rotatable about a fixed base, said monitor including a first portion and a second portion, the first portion being pivotable about a first axis relative to the base, and the second portion being pivotable about a second axis relative to the first portion and being supported by the first portion;
   a controller generating signals and transmitting said signals to said monitor for controlling said monitor; and
   a computer, said computer configured to receive input from a user relative to said monitor or said controller, said computer generating an output based on said input, and said output transmitted to said controller for controlling said monitor or said controller in accordance with said output.

2. The firefighting monitor system according to claim 1, further comprising a portable storage device, said computer adapted to communicate with said portable storage device for storing said output in said portable storage device, and said controller adapted to communicate with said portable storage device wherein said portable storage device transmits said output to said controller.

3. The firefighting monitor system according to claim 1, wherein said monitor includes an actuator for changing the position or configuration of a portion of the monitor, and said controller selectively generating signals for controlling said actuator based on said outputs.

4. The firefighting monitor system according to claim 3, wherein said monitor includes an inlet and an outlet, said actuator selectively positioning said outlet relative to said inlet.

5. The firefighting monitor system according to claim 4, wherein said actuator comprises a first actuator, said monitor further including a second actuator, said first actuator changing the position of said outlet relative to said inlet about said first axis, and said second actuator changing the position of said outlet relative to said inlet about said second axis, and said controller selectively controlling said first and second actuators based on said output.

6. The firefighting monitor system according to claim 5, wherein said first axis comprises a vertical axis, and said second axis comprises a horizontal axis.

7. The firefighting monitor system according to claim 4, wherein said actuator has a variable speed motor with a motor speed, said controller adjusting said motor speed based on said output.

8. The fire fighting monitor system according to claim 3, wherein said monitor includes a nozzle, said actuator selectively controlling the shape of the stream through the nozzle.

9. The firefighting monitor system according to claim 1, wherein said monitor has an adjustable travel limit, said controller adjusting said travel limit based on said output.

10. The firefighting monitor system according to claim 1, wherein said monitor has an adjustable stowed position, said controller adjusting said stowed position based on said output.

11. The firefighting monitor system according to claim 1, wherein said controller comprises a remote controller, said monitor further comprising a monitor-based controller and a receiver, said remote controller communicating with said receiver via a radio frequency signal, a serial bus signal, or a CANbus signal.

12. The fire fighting monitor system according to claim 11, wherein said remote controller is configurable between generating a radio frequency signal, a serial bus signal, or a CANbus signal for communicating with said receiver, and said controlled being configured to generate a radio frequency signal, a serial bus signal, or a CANbus signal for communicating with said receiver based on said output.

13. The firefighting monitor system according to claim 11, wherein said remote controller comprises a first remote controller, said fire fighting monitor system comprising a second remote controller, said output setting command priority between said first and second remote controllers.

14. The firefighting monitor system according to claim 1, wherein said controller includes programming, said programming being updated based on said output.

15. The fire fighting monitor system according to claim 1, wherein said first axis comprises a horizontal axis, and said second axis comprises a vertical axis.

16. The firefighting monitor system according to claim 1, wherein the first portion includes a first curved pipe section and the second portion includes a second curved pipe section.

17. The firefighting monitor system according to claim 16, wherein the second axis is non-parallel to the first axis.

18. The firefighting monitor system according to claim 1, wherein the second axis is non-parallel to the first axis.

19. A firefighting monitor system comprising:
a monitor rotatable about a fixed base, said monitor including a first portion and a second portion, the first portion being pivotable about a first axis relative to the base, and the second portion being pivotable about a second axis relative to the first portion and being supported by the first portion;
a controller generating signals and transmitting said signals to said monitor for controlling said monitor, said controller having stored therein a first parameter relative to said monitor; and
an input device operable to communicate with said controller, and said input device adapted to communicate with said controller and allow a user to modify said first parameter, upload a second parameter relative to the monitor to said controller, or select between said first and second parameters.

20. The fire fighting monitor system according to claim 19, wherein said controller is a monitor-based controller.

21. The firefighting monitor system according to claim 19, wherein said controller is a controller remote from said monitor.

22. The firefighting monitor system according to claim 19, wherein said input device comprises a computer.

23. The firefighting monitor system according to claim 19, wherein said input device is configured to allow a user to upload said parameters to said controller.

24. The firefighting monitor system according to claim 19, wherein the first portion includes a first curved pipe section and the second portion includes a second curved pipe section.

25. The firefighting monitor system according to claim 24, wherein the second axis is non-parallel to the first axis.

26. The firefighting monitor system according to claim 19, wherein the second axis is non-parallel to the first axis.

* * * * *